United States Patent [19]
Raz et al.

[11] Patent Number: 5,852,715
[45] Date of Patent: Dec. 22, 1998

[54] SYSTEM FOR CURRENTLY UPDATING DATABASE BY ONE HOST AND READING THE DATABASE BY DIFFERENT HOST FOR THE PURPOSE OF IMPLEMENTING DECISION SUPPORT FUNCTIONS

[75] Inventors: Yoav Raz, Newton; Philip Tamer, Lowell, both of Mass.

[73] Assignee: EMC Corporation, Hopkinton, Mass.

[21] Appl. No.: 617,689

[22] Filed: Mar. 19, 1996

[51] Int. Cl.⁶ .................................................... G06F 13/00
[52] U.S. Cl. ...................................................... 395/200.31
[58] Field of Search .................................... 395/827, 840, 395/841, 800, 608, 619, 603, 604, 615, 182.18, 475, 50, 200.32, 200.33, 200.61, 54, 680, 200.31

[56] References Cited

U.S. PATENT DOCUMENTS 5,161,103  11/1992  Kosaka et al. ............................. 705/36
5,267,148  11/1993  Kosaka et al. ............................. 705/37
5,495,606   2/1996  Borden et al. ............................. 707/3
5,555,169   9/1996  Namba et al. ............................. 704/9
5,561,798  10/1996  Haderle et al. ........................... 707/202
5,586,315  12/1996  Narang et al. ........................... 395/619
5,592,660   1/1997  Yokota et al. ........................... 395/608

OTHER PUBLICATIONS

"Replication at work", by Koop, Peggy, DEMS, v8, n3, p. 54(4), Mar. 1995.

Primary Examiner—Moustafa M. Meky
Attorney, Agent, or Firm—Fish & Richardson P.C.

[57] ABSTRACT

A method of implementing decision support in an environment including a data storage system and a plurality of host processors at least some of which are connected to the data storage system, wherein the data storage system stores a working database, the method including the steps of through a selected one of the plurality of host processors, updating the working database on an ongoing basis; while the working database is being updated on an ongoing basis, generating a copy of the working database; using the copy of the database to generate a support copy of the database; and through a different one of the plurality of host processors, using the support copy for the purpose of implementing decision support functions.

15 Claims, 4 Drawing Sheets

SYSTEM FOR CURRENTLY UPDATING DATABASE BY ONE HOST AND READING THE DATABASE BY DIFFERENT HOST FOR THE PURPOSE OF IMPLEMENTING DECISION SUPPORT FUNCTIONS

BACKGROUND OF THE INVENTION

The invention relates generally to decision support systems.

Decision support systems (DSS), as their name implies, are typically used to generate information for supporting decisions, such as business decisions. Decision-support systems analyze and evaluate data that is accumulated in the course of business operations. For example, the data might be marketing or sales data, it might be computer operations information, or it might be financial transaction information such as is generated through online transaction processing (OLTP) which is commonly used today by banks to provide their financial services to their customers. Typically, massive amounts of data are involved and the decision-support system performs very complex queries on that data.

Decision-support systems are frequently used to discover trends hidden in massive amounts of data, to detect market opportunities and to generally assist in long term strategic and business planing decisions. At the heart of many decision-support system is a software program that performs the data analysis. There is a considerable quantity of decision-support software that is available commercially and there is an equally large number of custom designed programs that have been generated in-house. These programs range in complexity from a simple two-dimensional spreadsheet program to much more sophisticated programs that can manipulate data in many dimensions.

These programs are used to access data for purposes of decision making, data analysis, forecasting, and time-series analysis. The programs help users to answer "what-if" questions, to generate financial models, and to extract useful information that might be hidden within often massive amounts of complex data. A wide variety of tools can be found among these DSS programs to perform these functions. These tools provide analysis in forms ranging from very simple measures such as totals, averages, and variances to the very complex measures including for example scatter plots, stem-and-leaf plots, and other probability plots. Other DSS tools exist which perform correlations, moving averages, trend curve fitting, risk analysis, regression analysis, and critical path analysis. The list of tools that are found in DSS programs is very long and reflects the almost limitless ways that data can be analyzed.

SUMMARY OF THE INVENTION

In general, in one aspect, the invention is a method of implementing decision support in an environment including a data storage system to which a plurality of host processors is connected and in which is stored a database. The method including the steps of through a selected one of the host processors, updating the database on an ongoing basis; and through a different one of the host processors, reading the database for the purpose of implementing decision support functions, wherein the updating and the reading of the database are allowed to take place concurrently without imposing any locks on the database.

In general, in another aspect, the invention is a method of implementing decision support in an environment including a data storage system and a plurality of host processors at least some of which are connected to the data storage system, and wherein the data storage system stores a working database. The method includes the steps of, through a selected one of the host processors, updating the working database on an ongoing basis; while the working database is being updated on an ongoing basis, generating or maintaining a copy of the working database; using the copy of the database to generate a support copy of the database; and through a different one of the host processors, using the support copy for the purpose of implementing decision support functions.

Preferred embodiments include the following features. The first-mentioned copy is a snapshot of the contents of the working database taken at a time $t_0$. The method also includes the steps of mirroring the working database to produce a mirror copy thereof, wherein the mirror copy is the first-mentioned copy and wherein the step of generating the support copy includes disconnecting the mirror copy from the working database at time $t_0$; and generating the support copy from the disconnected mirror copy. The step of generating the support copy further includes the steps of shutting down the working database; and after the working database has become quiet, disconnecting the mirror copy from the working database. Alternatively, if the database is not caused to become quiet before disconnecting, the step of generating the support copy from the disconnected copy involves making the disconnected copy consistent.

Also in preferred embodiments, the method further includes the steps of, after using the support copy for decision support functions, reconnecting the support copy to the working database; and resynchronizing the support copy with the working copy so that it again becomes a mirror copy of the working database. The method further includes the steps of, after using the support copy for decision support functions, generating a modified support copy by backing out changes which have occurred to the support copy as a result of using it for decision support functions; reconnecting the modified support copy to the working database; and resynchronizing the modified support copy with the working copy so that it again becomes a mirror copy of the working database.

Also, in preferred embodiments, the plurality of host processors includes a first host processor and a second host processor, wherein the first mentioned data storage system is a local data storage system which is connected to a remote data storage system through a data communications link, and wherein the first host processor is connected to the local data storage system and the second host processor is connected to the remote data storage system. In that system, the method further includes the steps of mirroring the working database to the remote data storage system to produce a remote database that is a mirror of the working database, wherein the step of mirroring is performed over the data communications link and wherein the updating and the mirroring take place concurrently so that changes made to the local database are recorded in the remote database on an ongoing basis, and wherein the support copy is derived from the remote database and wherein the second host processor uses the support copy for the purpose of implementing decision support functions. Alternatively, the method further includes the steps of initiating a concurrent copy of the working database at time $t_0$ to generate a remote copy thereof on the remote data storage system, wherein the support copy is derived from the remote copy; and through the second host processor, reading the support copy for the purpose of implementing decision support functions. In this latter case, the remote copy represents the value of the data within the working database at time $t_0$, and the updating and the concurrent copying take place concurrently.

The invention is particularly useful for performing decision-support functions with very large databases (e.g. 10's of gigabytes of data).

Other advantages and features will become apparent from the following description of the preferred embodiment and from the claims.

DESCRIPTION OF THE PREFERRED EMBODIMENTS

Figure 1:
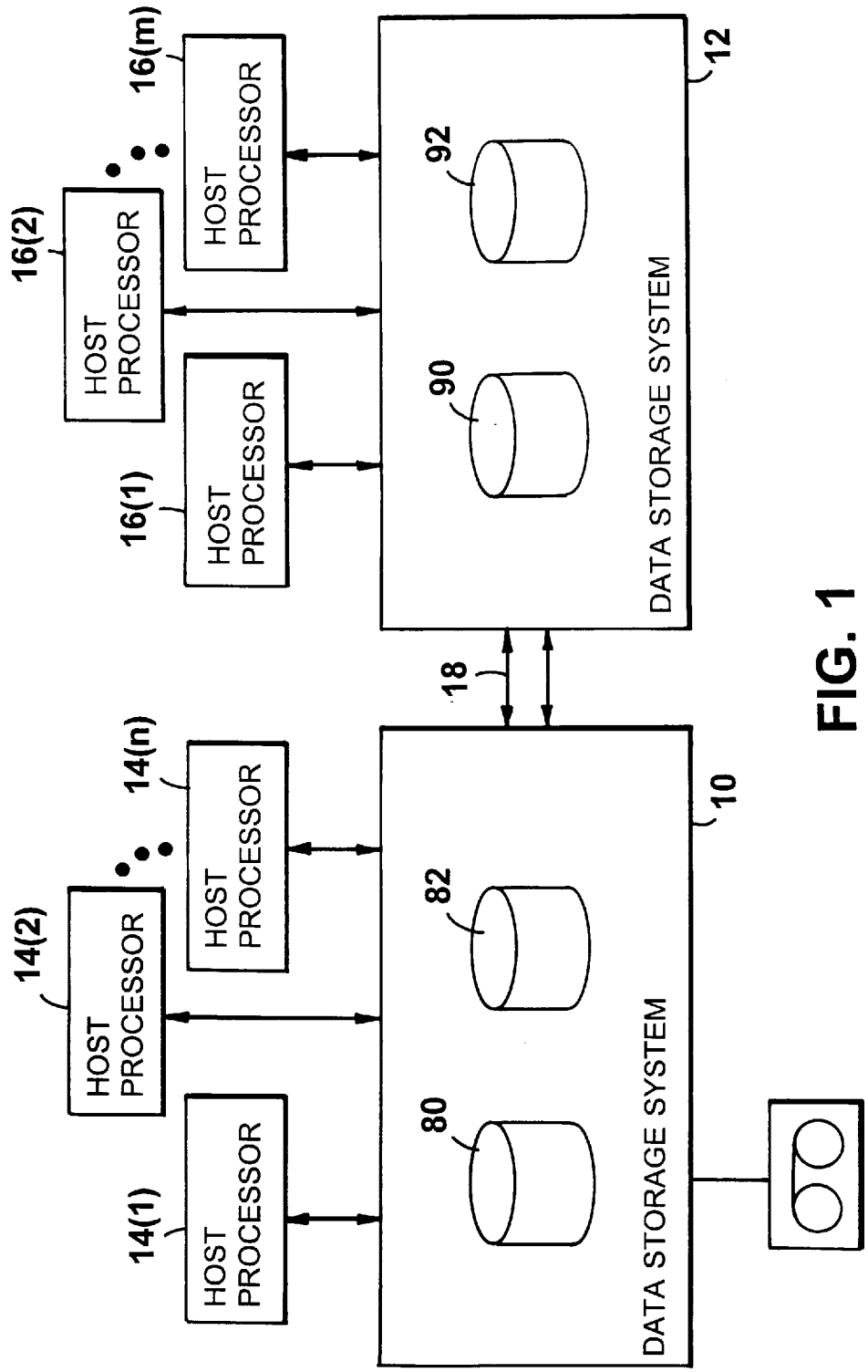
FIG. 1 is a block diagram of a system which can be used to implement the invention.

A system which will be used to describe the various aspects of the invention is shown in FIG. 1. It includes two data storage systems 10 and 12, which are located at geographically remote locations from each other. Data storage systems 10 and 12 will be referred to hereinafter as the primary and the secondary data storage systems, respectively. A plurality of host processors 14(1) through 14(n) are connected to primary data storage system 10 and a different plurality of host processors 16(1) through 16(m) are connected to data storage system 12. The two systems are connected to each other through a high speed communication link 18 over which data can be transferred between the two systems.

Figure 2:
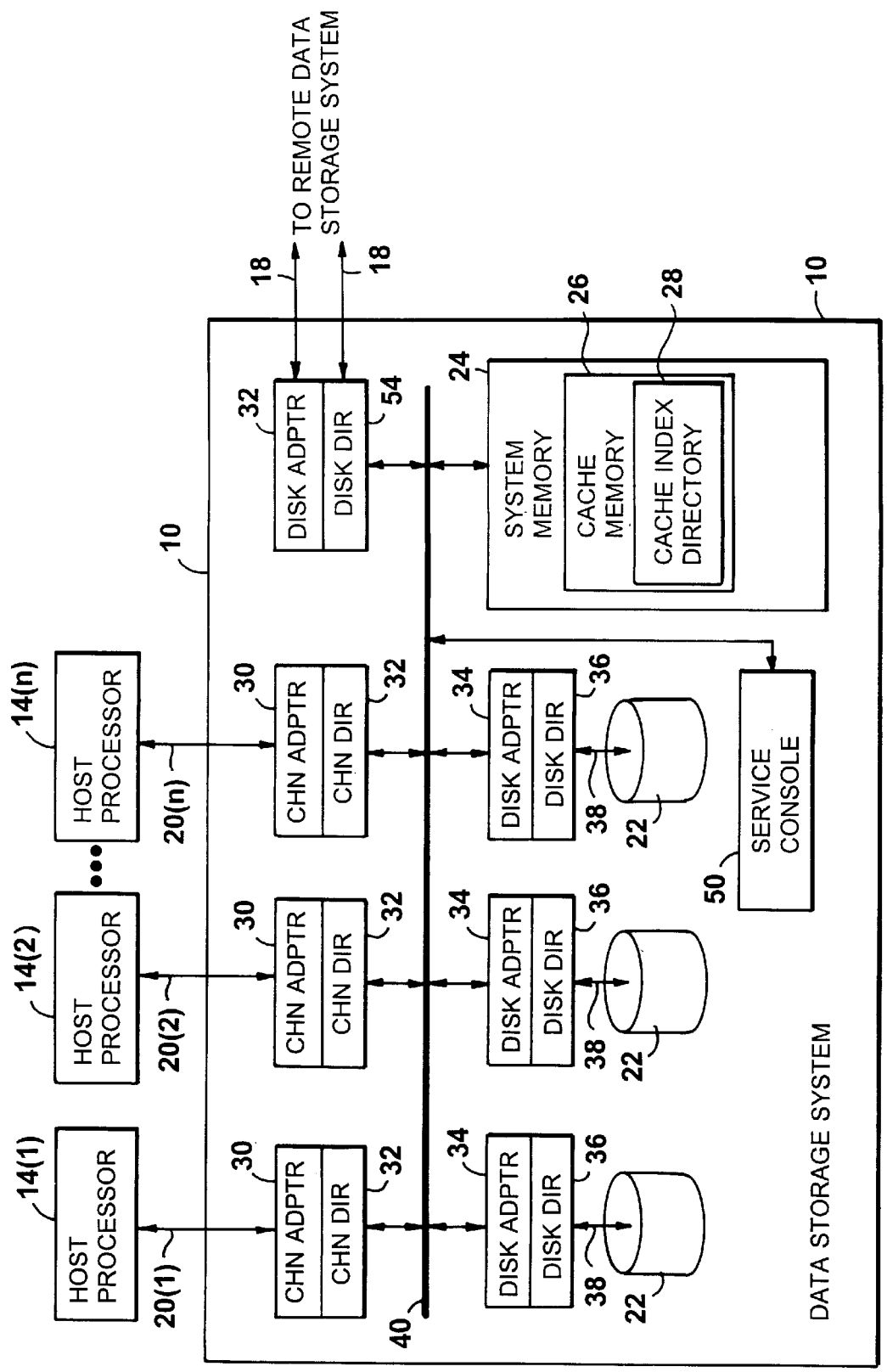
FIG. 2 is a block diagram of the internal structure of the data storage systems that are shown in FIG. 1.

Referring to FIG. 2, host processors 14(i) are each connected to data storage system 10 through respective host connections 20(1) through 20(n). To simplify the discussion, only a single host connection is shown for each host processor. It should be understood, however, that there could in fact be multiple connections between the data storage system and a processor.

Data storage system 10, which is identical to data storage system 12, contains the physical memory in which the data (e.g. the records of the database) is stored. The particular manner in which the physical memory within storage system is implemented and how it is partitioned is not of central importance. Examples of commercially available products that can be used to implement data storage systems 10 and 12 are the Symmetrix™ 5XXX series family of products from EMC Corporation of Hopkinton, Mass., which are high performance integrated cache disk arrays designed for online data storage. The following details about the internal structure and operation of data storage system 10 generally refer to the Symmetrix™ data storage systems. However, it should be understood that data storage systems of other known architectures may also be used.

Data storage system 10 includes multiple arrays of disk devices 22 and a system memory 24. A portion of system memory 24 implements cache memory 26. The multiple arrays of disk devices 22 provide a permanent data storage area and cache memory 26 provides a temporary data storage area. Each disk device 22 includes a head-disk assembly, a microprocessor, and a data buffer which enables the data storage system to provide for parallel processing of data. In the described embodiment, system memory 24 is implemented by high-speed random-access semiconductor memory. Within cache memory 26 there is a cache index directory 28 which provides an indication of what data is stored in cache memory 26 and the address of that data in cache memory 26. Cache index directory 28 is organized as a hierarchy of tables for devices, cylinders, and tracks of data records, as further described in U.S. Pat. No. 5,206,939, issued Apr. 27, 1993, and incorporated herein by reference.

There is a group of channel adapters 30 and channel directors 32 that provide interfaces through which host processors 14 connect to data storage system 10. Each channel adapter 30 provides for direct attachment to the physical host connections. Channel director 32, which handles I/O requests from host processors 14, contains a microprocessor that processes commands and data from host processors 14 and manages accesses to cache memory 26. It uses cache index directory 28 which is stored in cache memory 26 to determine whether the request can be satisfied out of the cache or whether the data must be obtained from disk devices 22. The particular data that is stored in cache memory is determined by the data access patterns of the data base applications that are running. Channel directors 32 write data from host processors 14 into cache memory 26 and update cache index directory 28. They also access cache index directory 26 and read data from cache memory 24 for transfer to host processors 14.

There is also a disk adapter 34 and a disk director 36 through which each disk device array 22 is connected to cache memory 26. Disk adapter 34 interfaces to multiple SCSI buses 38 to which disk device arrays 22 are connected. Disk director 36 manages accesses to the disks within disk device arrays 22. Disk Director 36 stages data from the disk device arrays to cache memory 26 and it updates cache index directory 28, accordingly. It also de-stages or writes-back data from "written-to" blocks in cache memory 26 to the disk device arrays and again updates cache index directory 28, accordingly.

Disk adapters 34 and channel adapters 30 access system memory 24 through a high-speed, parallel line system bus 40. System memory 24 is implemented by multiple memory boards. Only one accesses to any given memory board may occur at any given time, however, multiple memory boards may be accessed at the same time to support concurrent operations.

Data storage system 10 can be configured into multiple logical volumes. Typically, a volume corresponds to a single disk device. A service console 50 within data storage system 10 enables the user to configure the data storage, i.e., to define the logical volumes and to specify which logical volumes are accessible through which host connections 20.

High speed link 18 is constructed in accordance with the ESCON architecture of IBM, an architecture that is known to persons skilled in the art. High speed link 18 includes a dual optical fiber connection that uses serial data transmission. Independent processing units at either end of the connection control data movement from the connection to storage. More specifically, data storage system 10 includes a disk adapter 34 and a disk director 36, which couple internal bus 40 within the data storage system to high speed link 18. Similar components are present in the other data storage system.

Data storage systems 10 and 12 can be configured to implement local mirroring and/or remote mirroring, according to which duplicate copies of a logical volume or logical volumes are maintained on two separate physical disks. These capabilities are supported on commercially available systems such as, for example, the previously mentioned Symmetrix 5XXX series of data storage systems sold by EMC, Corp. In these systems, the remote mirroring capability and its associated features are referred to as the remote data facility (RDF).

In general, when data storage system 10 is configured to implement local mirroring, it generates and maintains the two copies of data by writing all modified data to two different disk devices within the same data storage system and it does this in a manner that is transparent to the host processors. Everything that is written to one volume is also written to a mirror volume and reads occur to both volumes, whichever produces the faster response. The data storage system handles write operations to a mirrored logical volume as normal write operations. That is, data is written to cache memory. Then, the disk adapters destage the data to both devices in the mirrored pair maintaining the identical copies of the data. Further details about one particular implementation of mirroring are presented in U.S. patent application Ser. No. 07/587,253, incorporated herein by reference, and now U.S. Pat. No. 5,335,352.

The importance of the mirroring feature to the present invention is that it enables the user to generate and maintain logically identical copies of portions of the database on two different disk devices within the data storage system.

Notice however, that at any given point in time, the database that is being actively updated, and thus also the mirror copy, is not fully consistent. This is because at any given time some transactions have not yet completed and thus the data in the database associated with those transactions may still change during the course of completing those transactions. To achieve a fully consistent database, it is necessary to allow all of the transactions to be completed before being any new transactions are begun. When the pending transactions are completed, the database will be consistent. A consistent state can be achieved by gracefully shutting down the database, i.e., by preventing new transactions from being initiated and letting the pending transactions to run to completion. Typically, commercially available database systems allow the user to shut down the database gracefully to achieve full consistency. After the database has been shutdown, then the snapshot of the database (i.e., a copy of its contents at that time) will be consistent. The relevance of this will become apparent shortly.

When data storage system 10 is configured to implement remote data mirroring, it generates and maintains a duplicate copy on the remote data storage system which is connected to the other end of high speed link 18. During remote data mirroring, the transfer of data over high speed link 18 operates in one of two modes, namely, a real-time mode and an asynchronous mode. In the real-time mode, the system copies data to the remote system during I/O at the primary system and it completes the copy before an I/O completion signal is sent to the host processing system. In the asynchronous mode, the data is copied to the remote system asynchronously from the time that the primary system returns the I/O completion signal. A system which implements the remote data mirroring is described in greater detail in U.S. patent application Ser. No. 08/052,039, entitled Remote Data Mirroring, filed Apr. 23, 1993, and incorporated herein by reference, now U.S. Pat. No. 5,544,347.

The data storage systems also implements another facility for generating a snapshot or copy of the state of the database at a given time. On the previously mentioned Symmetrix 5XXX series data storage systems, this facility is referred to as a backup recovery facility (or BRF). The feature is also commercially available from International Business Machines (IBM) and is generally referred to as the concurrent copy capability. In general, the backup recovery capability enables the user to generate a backup copy of the database onto a disk or tape without requiring a halt to all updating of the database by the database application while the backup copy is being made. Since generating a backup copy can take a considerable amount of time, not having to halt the updating of the database during copying greatly improves the performance of the database applications. In addition, even though copying and updating take place concurrently, the copy reflects the state of the database at the time that the backup recovery facility is started and it does not contain any of the updates that took place within the database while the copy was being made. If the backup recovery facility is initiated at a point in time when all pending transactions have been completed and before any new transactions have begun (i.e., when the database has been shutdown or become quiet), the data in the copy will be fully consistent.

The present embodiments employ the backup recovery facility technique to generate a copy of the database within the data storage system itself. This copy is then used to support DSS. The copy can be made in one of two ways. The first way is to simply use the backup recovery facility technique to first generate a backup copy on disk and then write the backup copy back to other volume(s) within the data storage system. Alternatively, the backup recovery facility can be performed within the data storage system itself so that the copy is made directly on the other volumes without having to first make a backup copy on external medium. Clearly, the latter approach would be quicker and more efficient; however, the first approach can be implemented without having to modify the data storage system internally.

In general, the backup recovery copy, or what shall also be referred to hereinafter as the concurrent copy, is generated as follows. Assume that there is a volume that is undergoing modifications. Before making the concurrent copy the activity is gracefully halted, i.e., all pending transactions are allowed to go to completion and all new transactions are halted. When the database has become quiet, i.e., it has reached a totally consistent state, the backup recovery facility is initiated and it begins to generate a copy of the database. After the backup recovery facility is initiated, database activity is allowed to resume. Thus, as the copy is being generated, updates to the data will be taking place. However, the source data (i.e., the data in the volumes being copied) is not overwritten until the original version of the data has been copied to disk or tape. When the backup recovery facility is initiated, the system allocates buffer space in cache memory to contain modified data. As long as that buffer is not full, writes that are attempted to portions of the volumes that have not yet been copied are directed to the buffer rather than to the volume. When the relevant portions of the original database has been copied, the contents of the buffer corresponding to those portions are read into the volumes. If the buffer becomes full, the system creates a sidefile to hold the original data from the affected track in the volume. Thus, when a write is attempted to a track that has not yet been copied, the contents of that track are copied to the sidefile and then the new value is written to the track. In other words, a temporary concurrent copy of the affected records is made to the sidefile. The sidefile is then read to the copy that is being generated and after the records have been read from the sidefile, the values are cleared from the sidefile to make room for other records.

The backup recovery facility copies the modified portions of the volumes first so that the buffer contents can be transferred into the original volumes.

As should be readily apparent, with this concurrent copy technique even if the data in the volumes is being modified as the copy is being made, the copy that is being generated reflects the state of the data in the database at the time that the backup recovery facility was invoked.

The generation of the concurrent copy can be done at a rate of about 5–10 MB/sec in the Symmetrix 5XXX series data storage systems, which is the limit of the internal SCSI interface that is used. Using the backup recovery facility, the isolation level of the copy will be 3, i.e., it will have the highest achievable consistency.

We will now describe several different modes of supporting DSS using the above-described facilities and one or both of the data storage systems shown in FIG. 1.

EXAMPLE #1

In this example, we assume that the decision-support functions are performed by using the same data storage system through which the database updating functions are performed. In other words, the portion of system shown in FIG. 1 which is relevant to this example is data storage system 10 with the plurality of host processors that are connected to it. We further assume that host processor 14(1) is performing updating functions to a database that is stored in a volume 80 within the data storage system. Data storage system 10 is configured to permit the other host processors 14(2)–14(n) to share volume 80 with host processor 14(1). Of course, it could also be the case that the database is spread across multiple volumes in data storage system 10 in which case, data storage system 10 would be configured to permit all of the other host processors to share all of those volumes with host processor 14(1). But for simplicity we will assume that the database is contained within a single volume.

In accordance with the first example, host processor 14(1) is permitted to both write data to and read data from the shared volume 80. In contrast, the other host processors 14(2)–14(n), by a restriction that may be enforced either at the host processor level or within the data storage system itself, are only permitted to read data from shared volume 80. Thus, for example, host processor 14(1) might be performing regular database work, e.g. online transaction processing or excepting update batches; while the remaining host processors 14(2)–14(n) are performing decision-support functions, for which only read capability is required and used.

Since only one host processor is writing to the database, no lock manager is needed to coordinate the accesses to the database by the other host processors. More specifically, though there may need to be intrahost locks for read/write accesses coming from the one host processor, there need not be interhost locks for the other host processors. Thus, reading of the data within the database for purposes of decision-support can take place concurrently with the updating of the database bvy the one host processor. That is, all of the host processors can operate concurrently, assuming that the above-described restriction on only allowing host processor 14(1) to perform updating is honored. Stated differently, the read accesses by the host processors that are performing decision-support can be done concurrently with the writing of data by host processor 14(1).

Under these conditions (i.e., assuming that the DSS reads occur concurrently with the writes performed by host processor 14(1)), there will of course be some "dirty reads". A dirty read occurs when data is read before the transaction that is updating the data is complete. Thus, the data may not be valid since the transaction before completing may again change the data or invalidate it.

If dirty data is used to perform projections, statistical analysis or other DSS functions, it can impact the quality of the results. However, on databases that are large, the occurrence of dirty reads is so small in comparison to the amount of data that is being processed to perform the DSS functions that the impact of such dirty reads will tend to be minimal. Assuming that dirty reads do occur, it is possible to typically achieve an isolation level of 1 in the copied data. (Note that the quality of the data is characterized by three isolation levels, namely, 1, 2, and 3, with 3 being the highest isolation level or the most consistent data.) For many purposes, an isolation level of 1 is acceptable. Thus, there may be no significant advantage to imposing a lock management function to simply prevent some dirty reads. Moreover, a substantial price is paid for demanding a higher isolation level. In online transaction processing, data is typically being modified and updated intensively and on an ongoing basis. If a locking protocol must be used, this will typically result in records being locked when the updating application needs to update those records. This will significantly lower throughput and degrade performance of the database application.

Of course, if the updating of the database is halted (e.g. the OLTP is stopped), then an isolation level of 3 (i.e., the highest isolation level) will be achievable.

Thus, in the first example we simply allow host processors which are performing DSS to read data from the database while another host processor is updating the database and without the imposition of any locking protocol. Of course, as soon as multiple host processors are permitted start to write to the database at the same time, it will become necessary to provide the services of a lock manager. This will significantly slow down the regular database functions that are being performed by the host processors that are modifying the database. Nevertheless, even under those circumstances the host processors that are performing DSS still do not require the services of a lock manager to perform their reads of the database.

EXAMPLE #2

Figure 3:
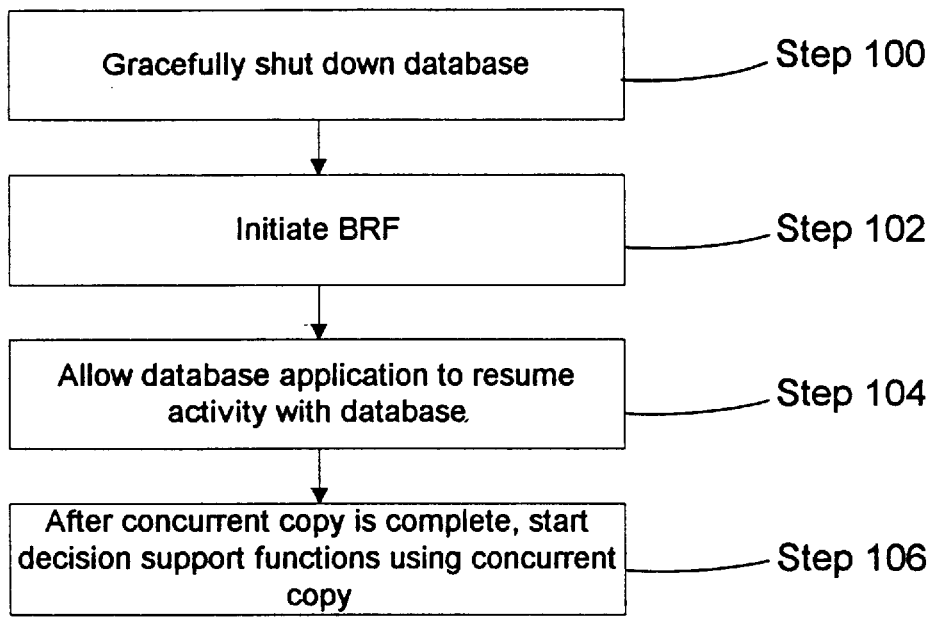
FIG. 3 presents the steps for generating a decision support copy by using the backup recovery facility.

We can increase the isolation level of the first example to level 3 (i.e., produce fully consistent data) by using the backup recovery facility feature to locally generate a duplicate copy of the database. In accordance with this alternative approach, referring to FIG. 3, the database application is gracefully shut down (step 100). Once the database has become quiet at some time $t_0$, the backup recovery facility is invoked and the generation of a concurrent copy on another shared volume 82 within data storage system 10 is begun (step 102). After the backup recovery facility has been invoked, the database application is allowed to resume its work on the database (step 104). At some later time, the concurrent copy will be complete and then decision support is begun using that copy (step 106). Since the concurrent copy is a snapshot of the original database taken at time $t_0$, the updating that takes place within the original database as the copy is being made will have no affect on the concurrent copy and thus will have no affect on the DSS functions.

EXAMPLE #3

A third example utilizes the local mirroring capability of the data storage systems. In this case, referring to FIG. 4, the data storage system invokes the local mirroring feature to generate locally a mirror copy of the source database (step 110). Since the copy is generated as a mirror copy, it remains current as long as it is connected to the source copy. When it is necessary to run decision support, the mirror copy is disconnected from the source copy (step 114). Since it may be important to have a fully consistent copy, it may be desirable to first perform a graceful shutdown of the database system before disconnecting the mirror copy so that at the time of disconnection, the mirror copy is fully consistent (step 112). After the mirror copy has been disconnected, the database application can be allowed to proceed with processing transactions in the source database (116) and decision support functions can be initiated using the disconnected mirror copy (step 118).

EXAMPLE #4

A fourth example involves two data storage systems 10 and 12 which communicate with each other over the high-speed link 18. In this case, we assume as before that host processor 14(1) is updating the database that is stored in volume 80 within data storage system 10. However, this time we assume that host processors 16(1)–16(m), which are connected to data storage system 12, are performing the DSS functions.

Figure 4:
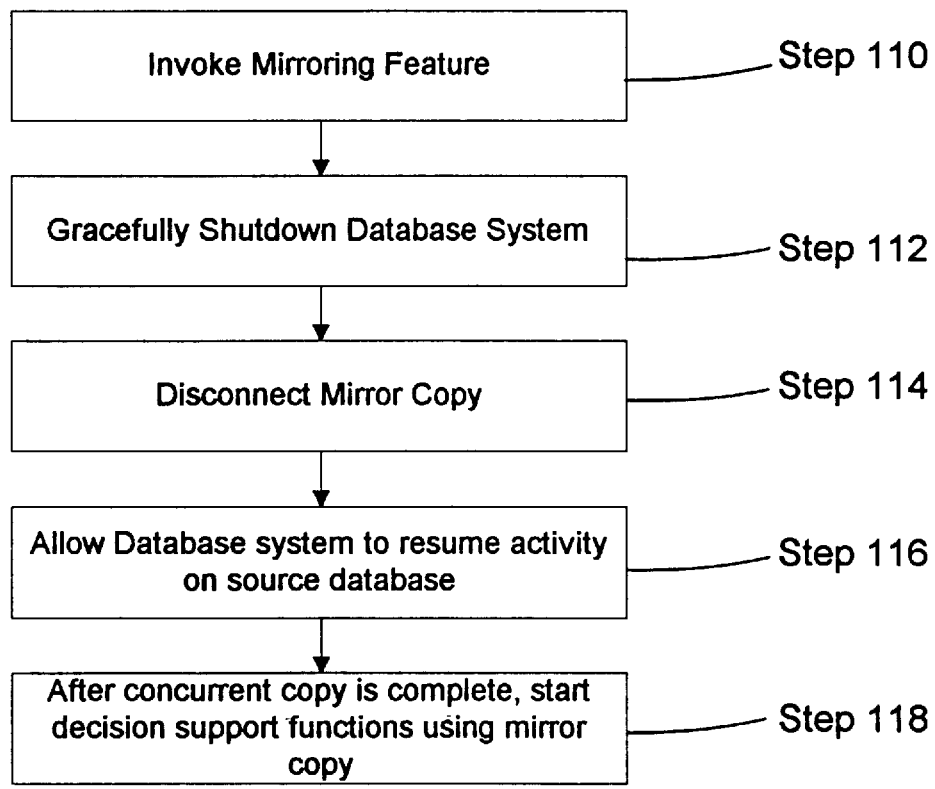
FIG. 4 presents the steps for generating a decision support copy by using the mirroring capability.

To make the data available for performing the DSS functions on data storage system 12, we use the remote mirroring capabilities to generate a mirror of the database on a volume 90 in secondary data storage system 12. Then, host processors 16(1)–16(m) use the remote mirror copy of the database in volume 90 for performing their DSS functions. In essence the procedure is the same as is shown in FIG. 4 except that in this case the mirror copy is created on the remote system.

The advantage of this is that the copy of the database that is used for decision-support is being generated concurrently with the primary database. Thus, it is always immediately available to host processors 16(1)–16(m). This completely avoids the delay and expense that is associated with generating a complete copy of the entire database at one time and then getting that copy into the secondary data storage system.

This approach would be particularly attractive to companies with offices that are scattered over widely separated geographical locations. Currently, those companies typically function as follows. They perform updating (e.g. OLTP) at one site and they perform decision support at another remotely located site. To get the data to the remote site for DSS, they copy the data onto a tape every night and send the tape (e.g. by Federal Express) to the remote site. This is selected as the attractive alternative because other methods of communicating the massive amounts of data that are typically involved are too expensive in terms of the time that would be required for such a data transfer using current technology. The data on the tape is then downloaded onto the system at the remote site and it is then used for DSS.

EXAMPLE #5

Since mirroring the original database may be undesirable because of the resulting degradation to the speed and performance of the updating functions, an alternative approach avoids using the mirroring capability on the original database in volume 80. Instead, a concurrent copy is generated locally in volume 82 using the BRF facility and this is remotely mirrored to secondary data storage system 12.

In the above examples, producing a consistent state in the copy involved gracefully shutting down the database application before disconnecting the mirror copy or before initiating the BRF. This implies a certain amount of inefficiency because there will be a period during which new transactions will not be accepted for processing. Many database systems typically include recovery capabilities which can be used to generate a fully consistent copy of the database without having to perform a graceful shut down. The recovery capabilities are made available to recover from a system crash which might occur during active processing of transactions. After a crash the database will typically be in an inconsistent state, i.e., some transactions will have been pending at the time of the crash and thus data in the database will be inconsistent. The recovery techniques bring it back to a consistent state.

In general, the recovery capabilities that are available in many database applications operate by generating and maintaining a log of all transactions. The log is used after a system failure to back out transactions in database that were not committed, i.e., to rollback the database to a consistent state. The log typically includes such information as the identity of the transaction, the new and old values of the items that were modified by the transaction, and an indication of whether the effect of the transaction was committed to the stored database. To rollback the stopped database, the log is run over the database using an algorithm which backs out the incompleted transactions. After the log is run over the database (i.e., after the database is recovered), then all transactions that were committed are reflected in the recovered copy of the database and the effects of all transactions that were not completed are removed from the copy of the database.

There are many approaches and algorithms for performing database recovery. Generally, commercially available database systems implement one or more such techniques. Various database recovery techniques are well known in the art and some of them are described in detail in many publicly available references. For such descriptions, we refer the reader to the public literature on database systems and transaction processing including, for example, *Fundamental of Database Systems,* by Ramez Elmasri and Shamkant B. Navathe, published by The Benjamin/Cummings Publishing Company, Inc., Redwood City, Calif., (1989); and *Transaction Processing, Concepts and Techniques,* by Jim Gray and Andreas Reuter, Morgan Kaufmann Publishers, San Francisco, Calif. (1993).

With the recovery capability, it is possible to disconnect the mirror copy or initiate BRF without having to shut down the database. The resulting snapshot of the database will, of course, likely be inconsistent, just as it would be if the system had unexpectedly crashed. The transaction log and the recovery algorithm can then be used to bring it to a consistent state.

Figure 5:
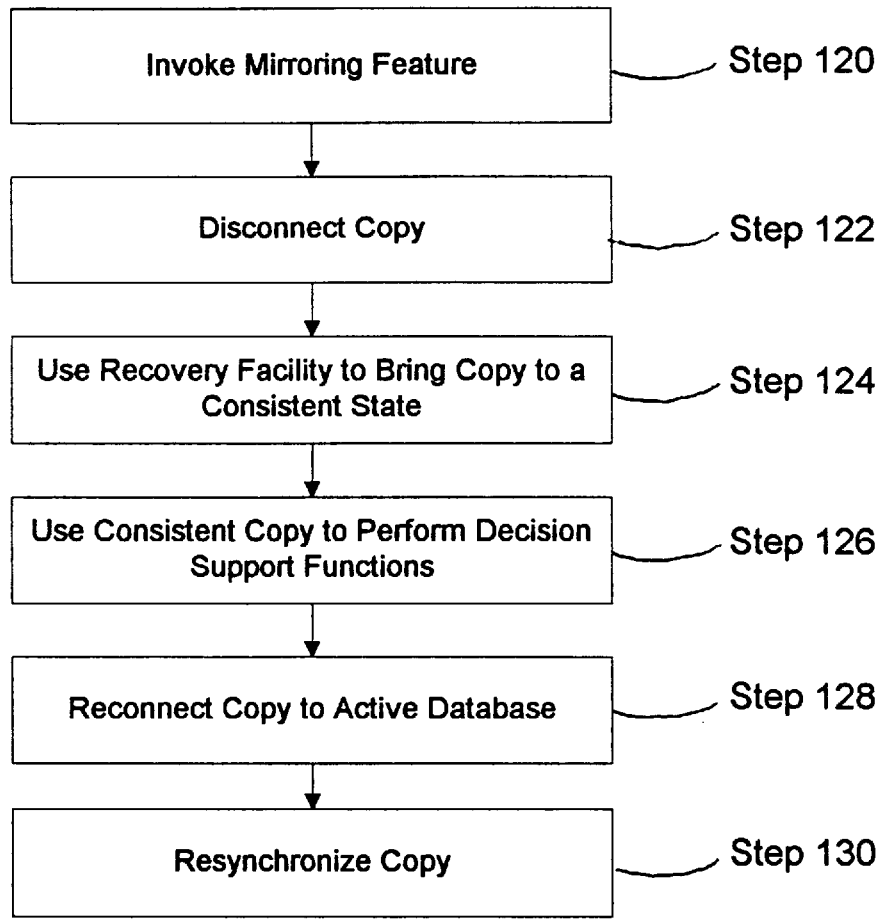
FIG. 5 presents the steps for generating a decision support copy of a database and subsequently resynchronizing it with the original copy of the database.

With the aid of the recovery tools, the process illustrated in FIG. 4 can be modified as shown in FIG. 5. In this example, remote mirroring or RDF is used to generate the copy (step 120). At some point it will be necessary to disconnect the remote mirror copy so that it can be used for decision support (step 122). The recovery facility is then used to bring the resulting copy to a consistent state (step 124), after which it can be used for decision support (step 126).

After the decision support copy has been used for awhile, it will tend to become outdated as more transactions are processed in the active database (e.g. the OLTP copy). Thus, it will eventually be necessary to generate a new copy. A brute force way is to simply generate another copy from the beginning by running the backup recovery facility again or by constructing another mirror, as described above. A more efficient method, however, is to resynchronize the outdated decision support copy with the original database. This can be accomplished by again using capabilities that are supported on commercially available data storage systems, such as the Symmetrix 5XXX series data storage system. With particular reference to the Symmetrix systems, they support a feature which enables the system to recover from a link failure during remote mirroring. The feature is part of its remote data facility (RDF)

As noted above, Symmetrix data storage units use two link paths. If one path between the local and the remote data storage units fails, the systems use the other path for communication of data to the target database. If both paths fail, then the source volume continues to write to its source database and it also marks all updated tracks. When the link is restored, the local unit resynchronizes the remote database by transferring the marked data to the target volumes. This feature can also be used to efficiently and quickly resynchronize the remote database with the local database even when the disconnection is deliberate, instead of through an unexpected link failure.

As shown in FIG. 5, the above-described procedure can further include the step of reconnecting the decision support copy to the original database (i.e., the active database) (step 128). After reconnection is established, the decision support copy is resynchronized with the original database using the facilities just described (step 130).

Figure 6:
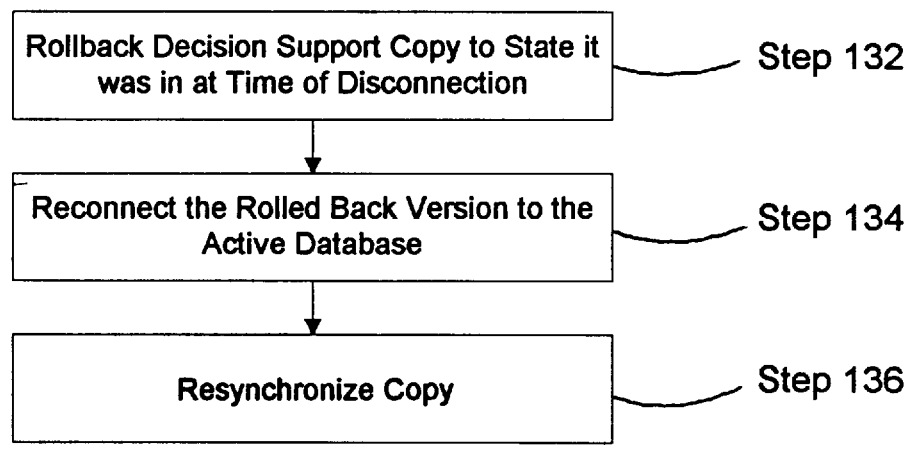
FIG. 6 presents the steps for bringing the decision support copy to a consistent state prior to resynchronizing it with the original database.

It is the case that many current database systems do not provide read-only capabilities. Thus, as the disconnected remote database is being used for decision support, writes are occurring to it. The writes are typically in one of two forms, namely, administrative operations such as time stamping of data that is read, and writing of intermediate results which occur as part of carrying out the queries requested by the decision support functions. In other words, the decision support function causes the remote database to become unsynchronized with the local database (i.e., the original or active database) even if no new transactions are processed in the local database. If such a database system is being used, the decision support database will need to be rolled back to an earlier state before reconnection to and resynchronization with the active database can occur. That is, resynchronizing also requires that all changes to the remote database must be backed out to bring it to the state in which it was in at the instant that it was disconnected from the local database. This function can be readily accomplished again by using the transaction log, as is done in the Symmetrix 5XXX series of data storage systems. Referring to FIG. 6, before reconnecting to the source database, the transaction log is used to back out all changes that were written to the database (step 132). Then, it is reconnected to the source (step 134), and resynchronized with the active database (step 136).

It should be understood that the decision support functions can also be performed by another process that is running on the same host as the process that is actively using the database. In other words, even though we have described the embodiments as utilizing at least two hosts, one for updating the database (e.g. performing OLTP) and the other for performing decision support, both functions could be performed by separate processes running on the same host. The advantage of using multiple hosts is that approach provides greater scalability than does the use of a single host processor. Nevertheless, the functions that were described above can be performed with multiple processes running on a single processor (e.g. an SMP or symmetric multiprocessor system Other embodiments are within the following claims. For example, the remote mirroring capability can be used to generate mirror copies at multiple remote sites. And decision support functions can then be run at each of the multiple sites.

In addition, the support copy that is created in the manner described above can also be used to generate a backup copy. In that case, the support copy would be passed to an external storage device 11, such as a tape drive (see FIG. 1). If the disconnected copy is inconsistent (i.e, if it is created without allowing the database to become quiet) then in addition to storing the support copy on the external storage device, one also stores the recovery log associated with that copy and with which the backup copy can be made consistent.

What is claimed is:

1. A method of implementing decision support in an environment including a data storage system to which a plurality of host processors is connected, wherein said data storage system stores a database, said method comprising:

through a selected one of said plurality of host processors, updating said database on an ongoing basis; and through a different one of said plurality of host processors, reading said database for the purpose of implementing decision support functions, wherein the updating and the reading of said database are allowed to take place concurrently without imposing any interhost locks on said database.

2. A method of implementing decision support in an environment including a data storage system and a plurality of host processors at least some of which are connected to the data storage system, wherein said data storage system stores a working database, said method comprising:

through a selected one of said plurality of host processors, updating said working database on an ongoing basis;

while said working database is being updated on an ongoing basis, mirroring said working database to generate a mirror copy of said working database;

using the mirror copy of the database to generate a support copy of the database; and through a different one of said plurality of host processors, using said support copy for the purpose of implementing decision support functions.

3. The method of claim 2 wherein the step of generating the support copy comprises:

disconnecting the mirror copy from the working database at time $t_0$; and generating the support copy from the disconnected mirror copy.

4. The method of claim 3 wherein the step of generating the support copy further comprises:

shutting down the working database; and after the working database has become quiet, disconnecting the mirror copy from the working database.

5. The method of claim 3 wherein the step of generating the support copy from the disconnected copy comprises making the disconnected copy consistent.

6. The method of claim 5 further comprising the steps of:

after using said support copy for decision support functions, reconnecting the support copy to the working database; and resynchronizing the support copy with the working copy so that it again becomes a mirror copy of the working database.

7. The method of claim 5 further comprising the steps of:

after using said support copy for decision support functions, generating a modified support copy by backing out changes which have occurred to the support copy as a result of using it for decision support functions;

reconnecting the modified support copy to the working database; and resynchronizing the modified support copy with the working copy so that it again becomes a mirror copy of the working database.

8. The method of claim 3 wherein the plurality of host processors includes a first host processor and a second host processor, wherein the first mentioned data storage system is a local data storage system which is connected to a remote data storage system through a data communications link, and wherein the first host processor is connected to the local data storage system and the second host processor is connected to the remote data storage system, said method further comprising:

mirroring said working database to the remote data storage system to produce a remote database that is a mirror of said working database, wherein the step of mirroring is performed over the data communications link and wherein the updating and the mirroring take place concurrently so that changes made to the local database are recorded in the remote database on an ongoing basis, wherein said support copy is derived from said remote database and wherein second host processor uses said support copy for the purpose of implementing decision support functions.

9. The method of claim 8 further comprising:

disconnecting the remote database copy from the working database; and generating the support copy from the disconnected mirror copy.

10. The method of claim 9 wherein the step of generating the support copy further comprises:

shutting down the working database; and after the working database has become quiet, disconnecting the mirror copy from the working database.

11. The method of claim 10 further comprising the steps of:

after using said support copy for decision support functions, reconnecting the support copy to the working database; and resynchronizing the support copy with the working copy so that it again becomes a mirror copy of the working database.

12. The method of claim 11 further comprising the steps of:

after using said support copy for decision support functions, generating a modified support copy by backing out changes which have occurred to the support copy as a result of using it for decision support functions;

reconnecting the modified support copy to the working database; and resynchronizing the modified support copy with the working copy so that it again becomes a mirror copy of the working database.

13. The method of claim 9 wherein the step of generating the support copy from the disconnected copy comprises making the disconnected copy consistent.

14. A method of implementing decision support in an environment including a data storage system and a plurality of host processors at least some of which are connected to the data storage system, wherein said data storage system stores a working database, said method comprising:

through a selected one of said plurality of host processors, updating said working database on an ongoing basis;

initiating a process of copying said working database at time $t_0$ generate a concurrent copy thereof, said concurrent copy representing the value of the data within said working database at time $t_0$, wherein said updating and said process of copying take place concurrently;

using the concurrent copy of the database to generate a support copy of the database; and through a different one of said plurality of host processors, using said support copy for the purpose of implementing decision support functions.

15. The method of claim 14 wherein the plurality of host processors includes a first host processor and a second host processor, wherein the first mentioned data storage system is a local data storage system which is connected to a remote data storage system through a data communications link, wherein the first host processor is connected to the local data storage system and the second host processor is connected to the remote data storage system, wherein the process of copying said working database at time $t_0$ generates said concurrent copy in said remote data storage system, said remote copy representing the value of the data within said working database at time $t_0$, and wherein the step of using said support copy for the purpose of implementing decision support functions is performed by said second host processor.

* * * * *